United States Patent
Zhang

(10) Patent No.: US 7,633,918 B2
(45) Date of Patent: Dec. 15, 2009

(54) METHOD FOR RELEASING A SERVICE TUNNEL IN A WIRELESS LOCAL AREA NETWORK

(75) Inventor: Wenlin Zhang, Shenzhen (CN)

(73) Assignee: Huawei Technologies Co., Ltd., Shenzhen, Guangdong (JP)

( * ) Notice: Subject to any disclaimer, the term of this patent is extended or adjusted under 35 U.S.C. 154(b) by 540 days.

(21) Appl. No.: 11/481,057

(22) Filed: Jul. 6, 2006

(65) Prior Publication Data

US 2007/0019600 A1  Jan. 25, 2007

Related U.S. Application Data

(63) Continuation of application No. PCT/CN2005/000020, filed on Jan. 6, 2005.

(30) Foreign Application Priority Data

Jan. 7, 2004  (CN) .................. 2004 1 0000334

(51) Int. Cl.
*H04W 4/00* (2006.01)
(52) U.S. Cl. .................. 370/338; 370/352; 370/353; 370/354; 370/355; 370/356; 709/218; 709/226; 709/227; 709/229; 709/245
(58) Field of Classification Search .......... 370/331, 370/338, 352–356, 401; 455/432.1, 436–444; 709/217–219, 223–229, 236, 245
See application file for complete search history.

(56) References Cited

U.S. PATENT DOCUMENTS 6,522,880 B1  2/2003  Verma et al.
6,665,718 B1 *  12/2003  Chuah et al. .................. 709/225

(Continued)

FOREIGN PATENT DOCUMENTS

| CN | 1095544 A | 11/1994 |
|---|---|---|
| CN | 1353559 A | 6/2002 |
| EP | 1093254 A2 | 4/2001 |
| JP | 2003-258827 A | 1/2009 |

(Continued)

OTHER PUBLICATIONS

3GPP TS 23.234 V2. 3.0 (Nov. 2003), 3rd Generation Partnership Project; Technical Specification Group Services and System Aspects; 3GPP System to Wireless Local Area Network (WLAN).
"Presentation of Specification to TSG or WG", TSGS#21 (03)0391, Meeting #21, Frankfurt, Germany, Sep. 22-25, 2003.

*Primary Examiner*—Charles N Appiah
*Assistant Examiner*—Olumide T Ajibade Akonai
(74) *Attorney, Agent, or Firm*—Darby & Darby P.C.

(57) ABSTRACT

The present invention discloses a method for releasing a service tunnel in WLAN. This method comprises: an originating end point that desires to release a service tunnel in a WLAN sending a release tunnel request to a corresponding end point of the service tunnel; the corresponding end point returning a release acknowledgement to the originating end point, and releasing resources of the service tunnel, a Packet Data Gateway (PDG) sends a tunnel disconnection report to a service authentication and authorization unit, and upon receiving the tunnel disconnection report, the service authentication and authorization unit updates self-stored information related to the released service tunnel. The method in accordance with the present invention makes it possible to implement the release of a designated service tunnel and release or update the related resources and information in time.

23 Claims, 5 Drawing Sheets

U.S. PATENT DOCUMENTS

| | | | | |
|---|---|---|---|---|
| 6,980,802 B2 * | 12/2005 | Jung | | 455/436 |
| 7,020,084 B1 * | 3/2006 | Tanaka et al. | | 370/235 |
| 7,107,066 B2 * | 9/2006 | Toth et al. | | 455/458 |
| 7,154,868 B1 * | 12/2006 | Sharma et al. | | 370/331 |
| 7,321,587 B2 * | 1/2008 | Gao et al. | | 370/388 |
| 7,466,675 B2 * | 12/2008 | Hart et al. | | 370/329 |
| 2002/0138635 A1 * | 9/2002 | Redlich et al. | | 709/229 |
| 2005/0088963 A1 * | 4/2005 | Phelps et al. | | 370/216 |

FOREIGN PATENT DOCUMENTS

| | | |
|---|---|---|
| WO | WO 02/17561 A | 2/2002 |
| WO | WO 02/069596 A2 | 9/2002 |

* cited by examiner

METHOD FOR RELEASING A SERVICE TUNNEL IN A WIRELESS LOCAL AREA NETWORK

CROSS-REFERENCE TO RELATED APPLICATIONS

This is a continuation of International Application No. PCT/CN2005/000020, filed on Jan. 6, 2005, now published as WO 2005/069546, published date Jul. 28, 2005, which designated the United States; which claims priority of Chinese Patent Application No. 200410000334.5, filed Jan. 7, 2004, the disclosure of each application is hereby incorporated by reference in their entirety.

FIELD OF THE INVENTION

The present invention relates to service tunneling techniques, and particularly, to a method for releasing a service tunnel in a wireless local area network (WLAN).

BACKGROUND OF THE INVENTION

Due to users' demand for an increasingly high rate of wireless access, there emerges the WLAN, which is able to provide high-rate wireless data access in a relatively small area. Various techniques have been used in WLAN, among which a technical standard with more applications is IEEE 802.11b. This standard involves the frequency band of 2.4 GHz with a data transmission rate up to 11 Mbps. Other technical standards involving the same frequency band include IEEE 802.11 g and the Bluetooth, where the data transmission rate of IEEE 802.11 g is up to 54 Mbps. There are other new standards such as IEEE 802.11a and ETSI BRAN Hiperlan2 which use the frequency band of 5 GHz with the transmission rate up to 54 Mbps as well.

Although there are various techniques for wireless access, most WLANs are utilized to transfer IP data packets. The specific WLAN access technique adopted by a wireless IP network is usually transparent to the upper level IP. Such a network is usually configured with Access Points for implementing wireless access of a user terminal and implements IP transmission with network controlling and connecting devices.

Along with the rising and developing of WLAN, the focus of research is shifting to the inter-working of WLAN among various wireless mobile communication networks, such as GSM, CDMA, WCDMA, TD-SCDMA, and CDMA2000. In accordance with the 3GPP standards, a user terminal is able to connect to Internet and Intranet via the WLAN access network and also connect to the home network and visited network of a 3GPP system via the WLAN access network. To be specific, when accessing locally, a WLAN user terminal, like WLAN user equipment (UE), will get connected to the 3GPP home network via the WLAN access network, as shown in FIG. 2; when roaming, it will get connected to the 3GPP visited network via the WLAN access network. Some entities of the 3GPP visited network are connected with corresponding entities of the 3GPP home network, for instance, the 3GPP Authentication, Authorization, Accounting (AAA) proxy in the visited network is connected with the 3GPP AAA server in the home network, the WLAN Access Gateway (WAG) in the visited network is connected with the Packet Data Gateway (PDG) in the home network, as shown in FIG. 1. FIG. 1 and FIG. 2 are the schematic diagrams illustrating networking architectures of a WLAN inter-working with a 3GPP system with and without roaming, respectively.

As shown in FIG. 1 and FIG. 2, a 3GPP system primarily comprises Home Subscriber Server (HSS)/ Home Location Register (HLR), 3GPP AAA Server, 3GPP AAA Proxy, WAG, PDG, Offline Charging System and Online Charging System (OCS). WLAN user terminals, WLAN access network, and all the entities of the 3GPP system together constitute a 3GPP-WLAN inter-working network, which can be used as a WLAN service system. In this service system, 3GPP AAA Server is in charge of the authentication, authorization, and accounting of a subscriber, collecting the charging information sent from the WLAN access network and transferring the information to the charging system; PDG is in charge of the transmission of the user's data from the WLAN access network to the 3GPP network or other packet networks; and the charging system receives and records the users' charging information transferred from the network. OCS instructs the network to transmit the online charging information periodically in accordance with the expense state of the online charged users and makes statistics and conducts control.

Under the non-roaming condition, when a WLAN user terminal desires to access directly to the Internet/Intranet, the WLAN user terminal can get access to Internet/Intranet via WLAN access network after it passes authentication and authorization of AAA server (AS) via WLAN access network. Should the WLAN user terminal desire to get access to the service of 3GPP packet switching (PS) domain as well, it may further request the service of Scenario 3 from the 3GPP home network. That is, the WLAN user terminal initiates a authorization request for the service of Scenario 3 to the AS of the 3GPP home network, which will carry out service authentication and authorization for that request; if it succeeds, AS will send an access-accepted message to the WLAN user terminal and assign a corresponding PDG for the WLAN user terminal. When a tunnel is established between the WLAN user terminal and the assigned PDG, the WLAN user terminal will be able to get access to the service of the 3GPP PS domain. Meanwhile, the CGW/CCF and the offline charging system (OCS) record the charging information in accordance with the WLAN user terminal's using state of the network.

Under the roaming condition, when a WLAN user terminal desires to get access directly to the Internet/Intranet, it may make a request to the 3GPP home network by way of the 3GPP visited network for access to the Internet/Intranet. Should the WLAN user terminal also desire to request the service of Scenario 3 to get access to the service of the 3GPP PS domain, the WLAN user terminal needs to initiate via the 3GPP visited network a service authorization procedure at the 3GPP home network. The authorization is carried out likewise between the WLAN user terminal and AS of the 3GPP home network. After the authorization succeeds, AS assigns the corresponding home PDG for the WLAN user terminal, then the WLAN user terminal will be able to get access to the service of 3GPP PS domain of the home network after it establishes a tunnel with the assigned PDG via the WAG of the 3GPP visited network.

At present, however, the international specifications define for a WLAN operating network only the procedure of establishing a service tunnel between a user and a PDG while needed. There has been so far no specific solution put forward to release a service tunnel and terminate the service when the use of the tunnel is over or when the tunnel has to be released due to certain special reasons.

SUMMARY OF THE INVENTION

The present invention provides a method for releasing a service tunnel in WLAN such that the releasing of a designated tunnel can be implemented in WLAN.

The technical solution in accordance with the present invention is as follows:

A method for releasing a service tunnel in a WLAN comprises:

an originating end point which desires to release a service tunnel in the WLAN sending a release tunnel request to the corresponding end point of the service tunnel to be released;

the corresponding end point returning a release acknowledgement to the originating end point initiating the release tunnel request, and releasing resources of the service tunnel.

The method further comprises:

the originating end point releasing the resources of the service tunnel due to receiving the release acknowledgement from the corresponding end point or timeout of service tunnel connection.

Or, the method further comprises:

the originating end point detecting whether having received the release acknowledgement from the corresponding end point; if the release acknowledgement has been received, releasing the resources of the service tunnel; if the release acknowledgement has not been received until timeout of service tunnel connection, resending the release tunnel request to the corresponding end point.

Wherein, the method further comprises: the originating end point detecting whether the release tunnel request has been sent for a preset number of times before resending the release tunnel request to the corresponding end point, if the request has been sent for the preset number of times, releasing the resources of the service tunnel; otherwise, resending the release tunnel request to the corresponding end point.

In the above solution, during process of releasing the resources of the service tunnel, the PDG removes all stored authorization information related to the UE therefrom when the PDG detects that the service tunnel to be released is the last service tunnel between itself and a corresponding UE.

In the above solution, the method further comprises: the PDG sending a tunnel disconnection report to a service authentication and authorization unit; upon receiving the tunnel disconnection report, the service authentication and authorization unit updating self-stored related service information and/or status of the subscriber.

Wherein, the tunnel disconnection report is carried in an existing service terminating signaling and sent to the service authentication and authorization unit. Said PDG sending a tunnel disconnection report to a service authentication and authorization unit comprises one of: the PDG releasing the tunnel resources related to the service tunnel kept by its own and then sending the tunnel disconnection report to the service authentication and authorization unit; the PDG sending the tunnel disconnection report to the service authentication and authorization unit and then releasing the tunnel resources related to the service tunnel kept by its own upon receiving an acknowledgement from the service authentication and authorization unit; the PDG releasing tunnel resources kept by its own other than resources for sending information to the service authorization and authentication unit, and then releasing the resources for sending information to the service authentication and authorization unit upon confirming that the tunnel disconnection report has been successfully sent to the service authentication and authorization unit.

In the above solution, the originating end point is a UE, the corresponding end point is a PDG; the PDG sending the tunnel disconnection report to the service authentication and authorization unit and sending the release acknowledgement to the UE.

The originating end point is a PDQ, the corresponding end point is a UE; the PDG sending the tunnel disconnection report to the service authentication and authorization unit upon receiving the release acknowledgement from the UE.

During process of releasing the resources of the service tunnel, the PDG removes all stored authorization information related to the UE therefrom when the PDG detects that the service tunnel to be released is the last service tunnel between itself and a corresponding UE.

In the above solution, the originating end point comprises UE or PDG, correspondingly, the corresponding end point comprises PDG or UE. The resources related to the service tunnel comprise at least one of: a tunnel ID of the service tunnel, an encryption key used by the service tunnel in communications, and physical resources. The method further comprises: releasing associated control information when releasing the resources related to the service tunnel; the associated control information comprise at least one of: subscriber service authorization information related to the service tunnel, and related information for maintaining the status of the service tunnel. The service authentication and authorization unit is a 3GPP Authentication Authorization and Accounting (AAA) Server (3GPP AAA Server).

In accordance with the method for releasing a service tunnel in WLAN provided by the present invention, an end point desiring to release a service tunnel initiates a tunnel releasing procedure, and the originating end point, an end point receiving the release tunnel request, and a service authentication and authorization unit release the resources of the service tunnel and self-stored associated control information of the service tunnel upon receiving the acknowledgement, the release tunnel request, the tunnel disconnection report or the clearing instruction, respectively. By this method, not only the release of a designated service tunnel can be realized in a WLAN, but also the resources and information related to the service tunnel can be cleared or updated after the service tunnel is released, thereby avoiding the resource occupation by redundant information in various devices.

BRIEF DESCRIPTION OF THE DRAWINGS

The FIGS. 1 and 2 are designated as schematic diagram in the prior art.

DETAILED DESCRIPTION OF PREFERRED EMBODIMENTS

Figure 1:
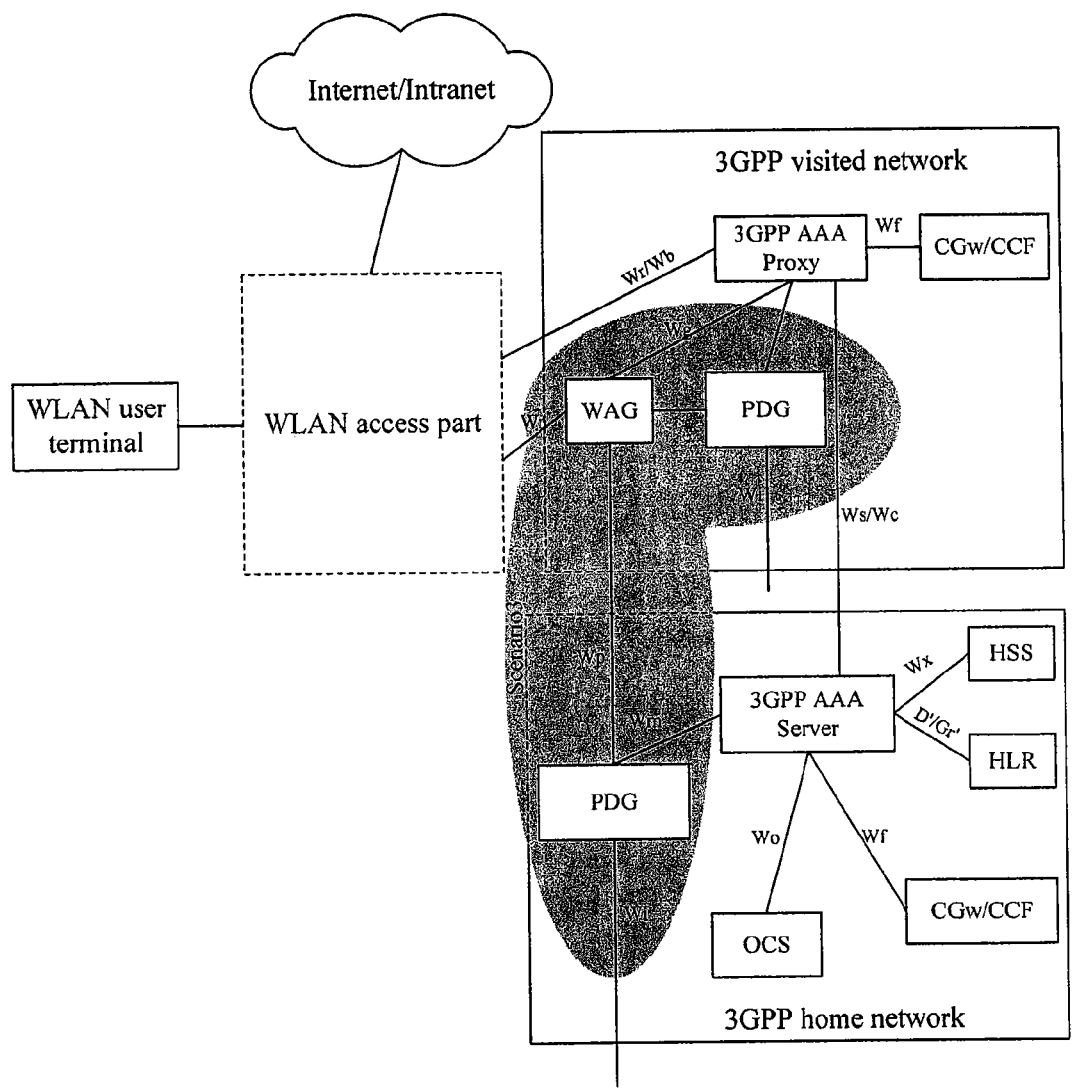
FIG. 1 is a schematic diagram illustrating a prior art network architecture of an inter-working WLAN system and 3GPP system in the roaming case in which the present invention is employed.
Figure 2:
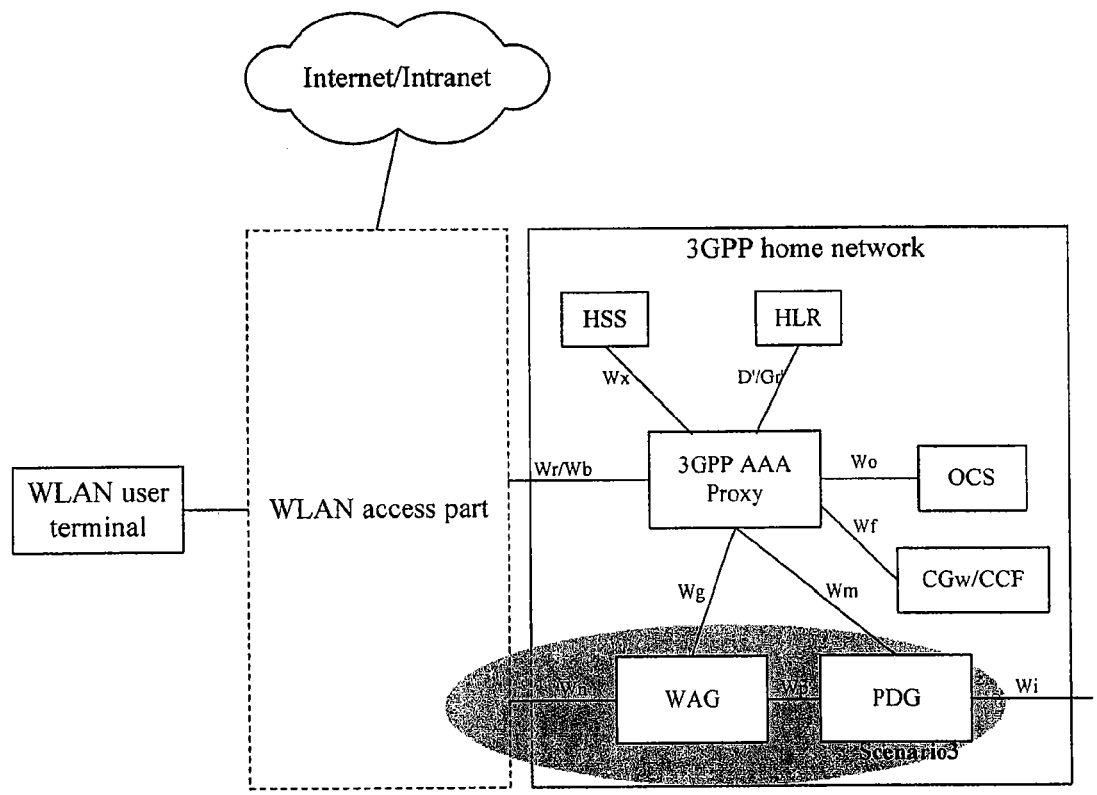
FIG. 2 is a schematic diagram illustrating a prior art network architecture of an inter-working WLAN system and 3GPP system under in the non-roaming case in which the present invention is employed.

In order to make the object, solution, and merits of this invention more clearer, this invention is hereinafter described in detail with reference to the accompanying drawings and specific embodiments.

According to preferred embodiments of the present invention, when a service tunnel need to be released, an originating end point desiring to release the service tunnel sends a release tunnel request to an corresponding end point of the service tunnel; the end point receiving the release tunnel request returns a release acknowledgement and releases the resources of the service tunnel kept by its own. Furthermore, the end point receiving the release acknowledgement releases the resources of the service tunnel; and the PDG may send a tunnel disconnection report to a service authentication and authorization unit, e.g. an AAA server, before, while, or after the resources of the service tunnel are released such that the service authentication and authorization unit may update self-stored information related to the service tunnel. The resources of the service tunnel comprise at least one of: a tunnel ID of the service tunnel, an encryption key used by the service tunnel in communications, and physical resources, e.g. ports, memories. When the resources of the service tunnel are released, the associated control information may be also released. The associated control information of the service tunnel comprises at least one of: subscriber service authorization information related to the service tunnel, and information for maintaining the status of the service tunnel.

According to the preferred embodiments of the present invention, there may be a number of reasons for initiating tunnel releasing procedure: termination of a service, timeout for a service tunnel, requests for releasing a service tunnel by other network nodes, such as an AAA server and an OCS, or intervention of the network management. However, even if such network node as an AAA server or an OCS, or the network management requests to release a service tunnel, a PDG will be involved to initiate a tunnel releasing. Therefore, the initiating operation for releasing each service tunnel will only involve two end points of a service tunnel, i.e., UE or PDG, and either UE or PDG may initiate a service tunnel releasing procedure.

In accordance with preferred embodiments of the present invention, the initiating procedure of releasing a service tunnel comprises the steps of:

(1) When a service tunnel in a WLAN needs to be released, the originating end point of the service tunnel sends a release tunnel request to the corresponding end point of the service tunnel.

(2) The corresponding end point receiving the release tunnel request returns a release acknowledgement to the originating end point, and releases the resources of the released service tunnel.

In step (2), the corresponding end point receiving the release tunnel request may return a release acknowledgement before releasing the resources; or release the resources before returning a release acknowledgement to originating end point. The resources still comprise at least one of: a tunnel ID of the service tunnel, an encryption key used by the service tunnel in communications, physical resources, e.g. ports, memories. When the resources of the service tunnel are released, the associated control information may be also released. The associated control information of the service tunnel comprises at least one of: subscriber service authorization information related to the service tunnel, and information for maintaining the status of the service tunnel.

If the originating end point of releasing the service tunnel receives the release acknowledgement from the corresponding end point within a preset time period of waiting for an acknowledgement, the originating end point releases the resources of the service tunnel; if receiving no acknowledgement from the corresponding end point within the preset time period of waiting for an acknowledgement, the originating end point won't release the resources of the service tunnel until the preset time period of waiting for an acknowledgment is expired, or releases the resources of the service tunnel if receiving no acknowledgement from the corresponding end point after sending the release tunnel request for a preset number of times. Generally, the former solution of releasing tunnel is selected if the originating end point is a PDG, i.e., releases the resources of the service tunnel if receiving no acknowledgement within the preset time period, while the latter solution of releasing tunnel is selected if the originating end point is a UE, i.e., tries again if receiving no acknowledgement within the preset time period and does not release the resources of the service tunnel until receiving an acknowledgement or within a preset number of trials.

In practical terms, a timer may be set. If the originating end point receives a release acknowledgement at any time before the timer expires, the originating end point will release the resources of the service tunnel, and the timer is cancelled. If the release acknowledgement has not been received before the timer expires, the originating end point will wait before the timer expires and make appropriate processing, e.g., releasing the resources of the service tunnel, or sending a release tunnel request again when the timer expires.

(3) The PDG will send a tunnel disconnection report to the service authentication and authorization unit, e.g., an AAA server, in the process of releasing the resources of the service tunnel or after releasing the resources such that the service authentication and authorization unit, e.g., an AAA server, could update self-stored related information of the service tunnel/subscriber. The tunnel disconnection report may be contained in an individual message, or attached to an existing service terminating signaling.

In the above procedure, when the last service tunnel between a UE and a PDG is released, the PDG should clear all the self-stored authorization information of the UE.

The service authentication and authorization unit, e.g., an AAA server, should return an acknowledgement, ACK, to the PDG upon receiving the tunnel disconnection report. If the PDG has not received the ACK within a preset time period, the PDG should try again to send a tunnel disconnection report to the service authentication and authorization unit. Likewise, a total number of times for sending the tunnel disconnection report may be defined in advance.

A service tunnel releasing procedure may be part of a normal service terminating procedure, or be a specific releasing procedure due to timeout of a service tunnel, or a PDG-initiating releasing procedure requested by other network devices. The main reasons for releasing a service tunnel may be: (1) releasing a service tunnel due to a service terminating request sent by a UE, which comprises initiating the release via a tunnel control signaling and clearing IP bearer information related to the service; (2) service termination caused by operator's intervention; (3) interruption of subscriber connection because radio signals have vanished.

Embodiment 1

A Tunnel Releasing Procedure Initiated by a UE

In this embodiment, the originating end point of releasing a service tunnel is a UE, the service authentication and authorization unit is a 3GPP AAA Server and the reason for releasing the tunnel is that the service is terminated.

Figure 3:
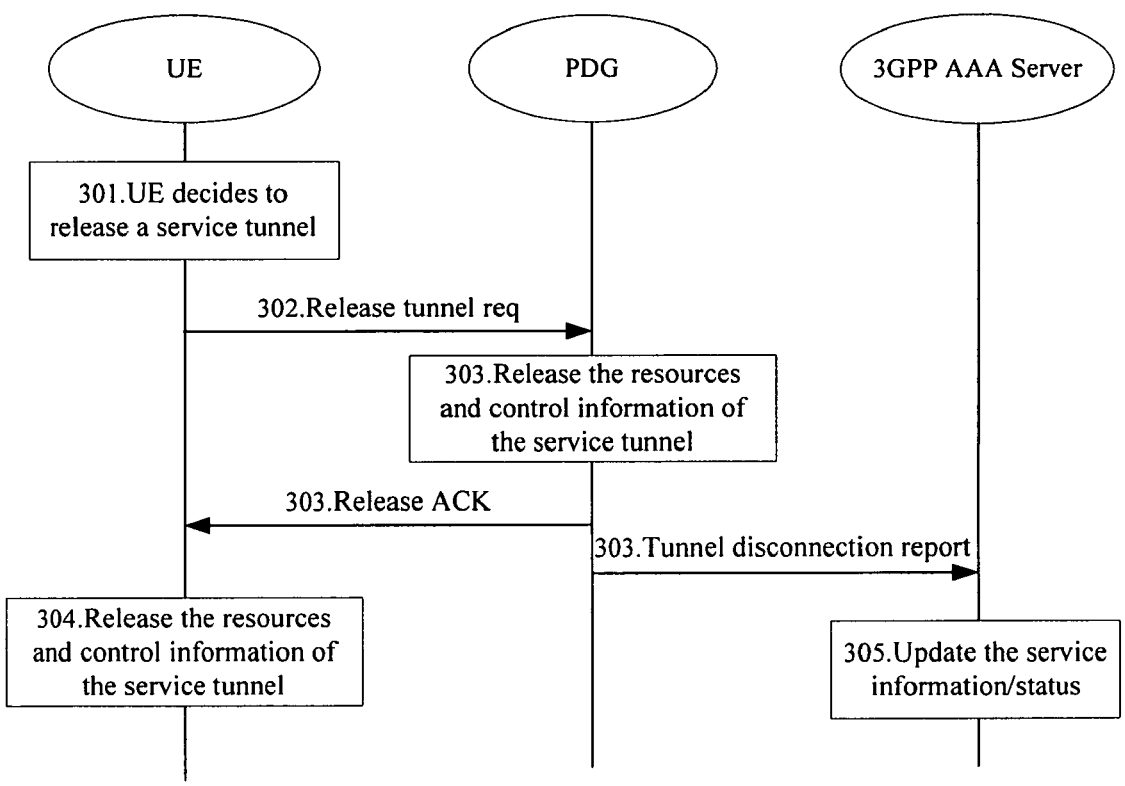
FIG. 3 is a flowchart of a UE initiating a tunnel releasing procedure.

As shown in FIG. 3, a tunnel releasing procedure initiated by a UE comprises:

Steps 301~302: When a subscriber service is terminated, the UE decides to initiate a tunnel releasing procedure to release the service tunnel used by the service to be terminated. Thus, the UE sends to the PDG a release tunnel request (Release tunnel req).

Step 303: Upon receiving the Release tunnel req from the UE, the PDG sends a release acknowledgment (Release ACK) to the UE that initiates the tunnel releasing procedure. Then the PDG starts releasing the resources and associated control information of the service tunnel to be released, and sends a tunnel disconnection report to the 3GPP AAA Server, indicating that the service tunnel serving the subscriber has been released.

In this step, the PDG may release the resources of the service tunnel before sending a tunnel disconnection report to the 3GPP AAA Server. Or the PDG may send to the 3GPP AAA Server a tunnel disconnection report and wait for an acknowledgement from the 3GPP AAA Server before releasing the resources of the service tunnel. Or, the PDG may release part of the tunnel resources, keep the information that needs to be sent to the 3GPP AAA Server, and then release the remaining information after confirming that the tunnel disconnection report has been successfully sent to the 3GPP AAA Server. The tunnel resource information comprises at least one of: a tunnel ID, an encryption key related to the tunnel, physical resources, e.g. ports, memories. The associated control information of the service tunnel comprises at least one of: subscriber service authorization information related to the service tunnel, and information for maintaining the status of the service tunnel.

In this step, if the PDG finds the current tunnel to be released is the last service tunnel between itself and the UE, the PDG will clear all the stored authorization information corresponding to the UE while releasing associated control information of the service tunnel.

Step 304: Upon receiving the Release ACK, the UE releases self-stored associated control information and resources of the service tunnel. If receiving no ACK within the preset time period, the UE may initiate a tunnel releasing procedure again.

Step 305: Upon receiving the tunnel disconnection report, the 3GPP AAA Server updates self-stored related information of the service tunnel/subscriber. The related information of the service tunnel/subscriber includes (but not limited to) the service/tunnel connection activation information, the allocated IP address, the status of the service tunnel, the tunnel ID and the tunnel security information.

It is necessary for the 3GPP AAA Server to return an ACK to the PDG upon receiving the tunnel disconnection report. If the PDG has not received the ACK within the preset time period, the PDG should try to send a tunnel disconnection report to the service authentication and authorization unit again.

Embodiment 2

A Tunnel Releasing Procedure Initiated by a PDG

In this embodiment, the originating end point of releasing a service tunnel is a PDG, the service authentication and authorization unit is a 3GPP AAA Server, and the reason for releasing the service tunnel is intervention by the operation and maintenance personnel, or timeout of the service tunnel, or requests sent by other network devices. Specifically, the reason may be:

(1) When the operation and maintenance personnel intervene via a maintenance platform to release the service tunnel of a UE, the PDG initiates a service tunnel releasing procedure.

(2) When deciding according to the relevant rules that the service tunnel is time out and needs to be released, the PDG initiates a service tunnel releasing procedure.

(3) When the 3GPP AAA Server receives an instruction from an OCS of limiting the service tunnel of the subscriber or receives changed subscriber subscription information from the HSS which will limit the service authorization, the 3GPP AAA Server will decide whether to request the corresponding PDG to release the related service tunnel. If the 3GPP AAA Server notifies the corresponding PDG; the PDG will initiate a service tunnel releasing procedure.

Figure 4:
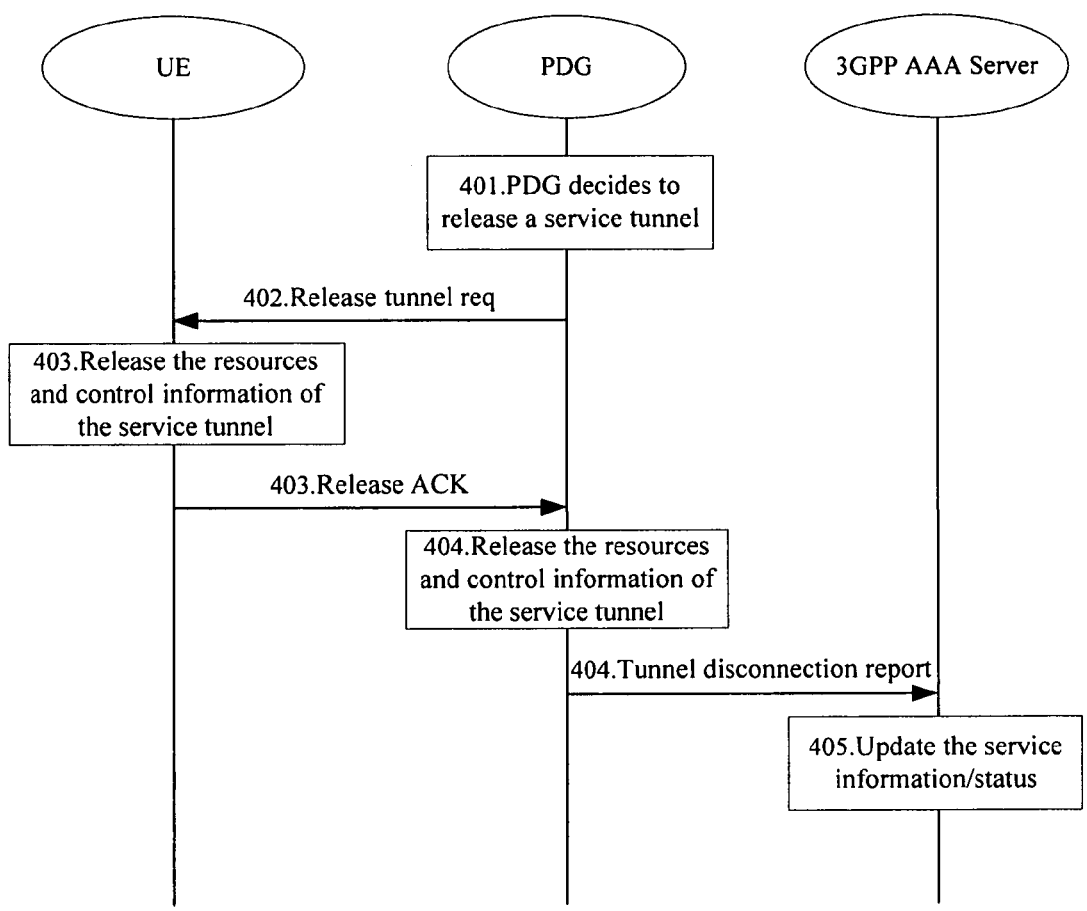
FIG. 4 is a flowchart of a PDG initiating a tunnel releasing procedure.

As shown in FIG. 4, a tunnel releasing procedure initiated by a PDG in this embodiment comprises the steps of:

Steps 401~402: When the PDG receives an instruction of releasing a service tunnel or decides by itself that a service tunnel is to be released, the PDG sends a Release tunnel req to the UE.

Step 403: Upon receiving the Release tunnel req, the UE returns a Release ACK to the PDG; and releases resources and associated control information of the service tunnel. The UE may return the Release ACK before releasing the tunnel resources of the service tunnel, or may release the resources of the service tunnel before returning the Release ACK.

Step 404: Upon receiving the Release ACK within a preset waiting time period, the PDG starts to release the resources of the service tunnel and self-stored control information of the service tunnel, and sends to a 3GPP AAA Server a Tunnel disconnection report, indicating that the designated service tunnel has been released.

If the PDG has not received a Release ACK sent from the UE within the preset time period, the PDG may release the resources of the service tunnel immediately; or release the resources of the service tunnel after the preset time period is expired.

The PDG may release the resources of the service tunnel before sending a tunnel disconnection report to the 3GPP AAA Server. Or, the PDG may send a tunnel disconnection report and wait for an ACK from the 3GPP AAA Server before releasing the resources of the service tunnel. Or, the PDG may release part of the resources of the service tunnel, keep information to be sent to the 3GPP AAA Server, and release the remained information after confirming that the information has been successfully sent to the 3GPP AAA Server.

If the PDG finds that the current service tunnel to be released is the last service tunnel between the corresponding UE and the PDG, the PDG will clear all the stored authorization information corresponding to the UE while releasing information related to the service tunnel.

Step 405: Upon receiving the tunnel disconnection report, the 3GPP AAA Server updates resources and self-stored related service information and/or status of subscriber. The related service information includes (but not limited to) the service/tunnel connection activation information, the allocated IP address, the status of the service tunnel, the tunnel ID and the tunnel security information.

Embodiment 3

A Tunnel Releasing Procedure Triggered by Termination of a Service

In this embodiment, the originating end point of releasing a service tunnel is a UE, the service authentication and authorization unit is a 3GPP AAA Server and the reason for releasing the tunnel is that the service is terminated.

Figure 5:
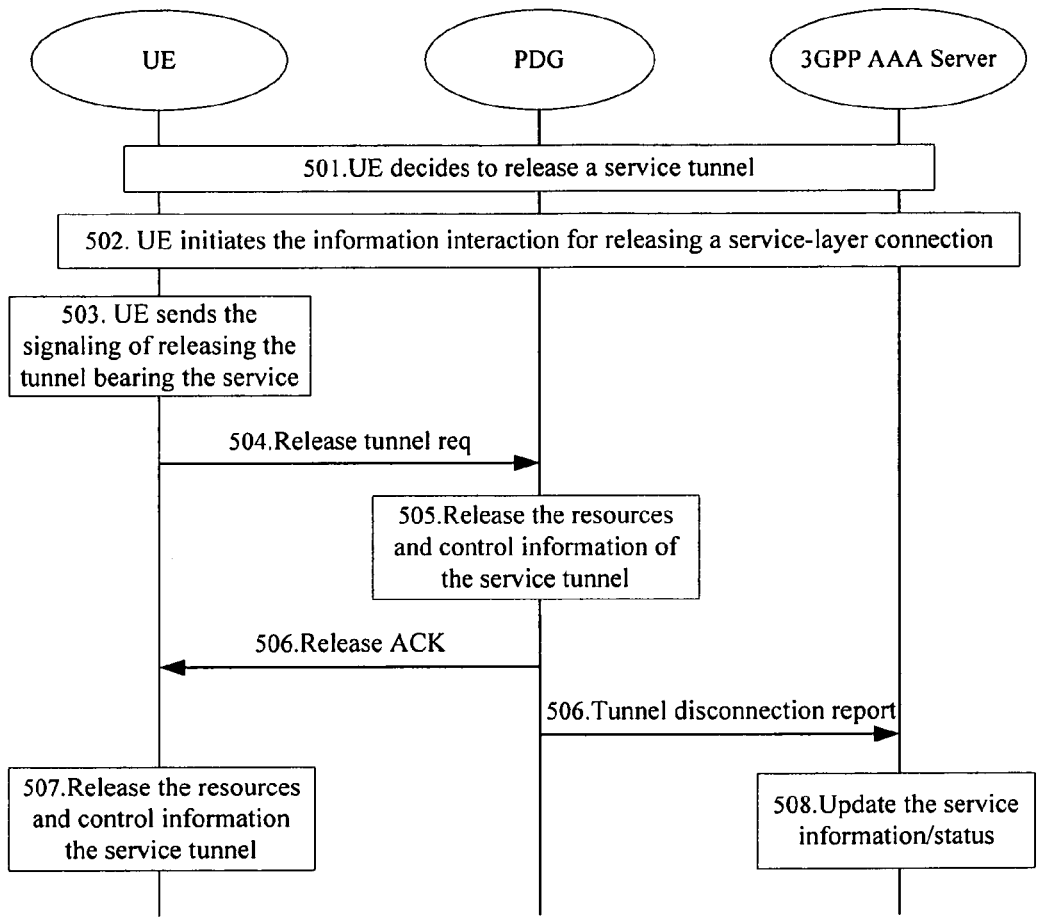
FIG. 5 is a flowchart of a tunnel releasing procedure triggered by termination of a service.

As shown in FIG. 5, a tunnel releasing procedure triggered by termination of a service comprises the steps of:

Steps 501~502: When deciding to terminate a service, the UE initiates the information interaction of releasing a service-layer connection.

Steps 503~507 are completely the same as steps 301~304 in Embodiment 1.

The major difference between this embodiment and Embodiment 1 is in Step 502. As in the procedure of releasing the service-layer connection initiated by the subscriber the relevant parameter or status in the 3GPP AAA server may have been cleared in the 3GPP AAA Server in Step 502, e.g., the activation status of the service and the authorized APN (Access Point Name) corresponding to the service. Therefore, the difference between step 508 and step 305 is that the 3GPP AAA Server needs only to update the tunnel ID of the service tunnel, e.g., the 3GPP AAA Server needs only to update such information as the recorded service tunnel ID, the IP address, and the PDG address corresponding to the tunnel and the service.

Obviously, upon receiving the tunnel releasing signaling of the service layer and completing the tunnel releasing in the service layer, the 3GPP AAA Server may as well keep relevant service information, and update all relevant service information upon receiving a tunnel disconnection report from the PDG within a present time period. Alternatively, the 3GPP AAA server may update all relevant service information after the preset time period of sending a tunnel disconnection report is expired. After that, the processing of step 508 is completely the same as the processing of step 305 in Embodiment 1.

In addition to the cases described in the above embodiments, there may be a special situation in practical applications, i.e., the connection is lost between the two end points of the service tunnel to be released such that no signaling could be exchanged to maintain normal processing for releasing the tunnel. In this case, if the originating end point sends a request to the corresponding end point, the subsequent processing of the originating end point is basically the same as the process of the case that no acknowledgement can be received due to timeout, while the difference is that the originating device may skip the procedure of sending request and waiting for acknowledgement if the originating end point has determined that no signal could be sent to the corresponding end point, e.g., it could not receive any signal from the corresponding end point before the service tunnel is released.

In said special case, the tunnel releasing procedure initiated by a PDG is as follows: the network device that has detected the disconnection of the UE, for example, the AP or AC in a WLAN or a WAG in a 3GPP network notifies the PDG that the connection of the UE is lost. Obviously, the PDG itself may detect the disconnection of the UE. If the state of disconnection continues for a period of time, the PDG will initiate by itself the process of releasing the relevant service tunnel. The PDG will release the resources of the service tunnel and send a report to the 3GPP AAA Server, instead of sending a release tunnel request to the UE and waiting for an acknowledgement.

In said special case, if the UE detecting that the PDG is inaccessible through wireless connection or the bottom physical connection and no information can be sent to the PDG for a preset period of time, the UE may directly release the resources of the service tunnel and self-stored control information of the service tunnel.

The foregoing description is only the preferred embodiments of the present invention and should not be construed as limiting the protection scope thereof.

The invention claimed is:

1. A method for releasing a service tunnel in a wireless local area network (WLAN), comprising:
   an originating end point in the form of user equipment (UE), which desires to release a service tunnel in the WLAN, sending a release tunnel request to a corresponding end point in the form of a Packet Data Gateway (PDG) of the service tunnel to be released;
   the corresponding end point returning a release acknowledgement to the originating end point and releasing resources of the service tunnel;
   the PDG sending a tunnel disconnection report to a service authentication and authorization unit; and
   upon receiving the tunnel disconnection report, the service authentication and authorization unit updating self-stored related service information and/or status of the subscriber.

2. The method according to claim 1, further comprising:
   the originating end point releasing the resources of the service tunnel due to receiving the release acknowledgement from the corresponding end point or a timeout of service tunnel connection.

3. The method according to claim 1, further comprising:
   the originating end point detecting whether having received the release acknowledgement from the corresponding end point,
   if the release acknowledgement has been received, releasing the resources of the service tunnel;
   if the release acknowledgement has not been received until a timeout of service tunnel connection, resending the release tunnel request to the corresponding end point.

4. The method according to claim 3, further comprising:
   the originating end point detecting whether the release tunnel request has been sent a preset number of times before resending the release tunnel request to the corresponding end point, if the request has been sent for the preset number of times, releasing the resources of the service tunnel; otherwise, resending the release tunnel request to the corresponding end point.

5. The method according to claim 1, wherein said resources of the service tunnel comprise at least one of: a tunnel ID of the service tunnel, an encryption key used by the service tunnel in communications and physical resources of the service tunnel.

6. The method according to claim 1, further comprising:
   releasing associated control information of the service tunnel when releasing the resources of the service tunnel;
   wherein the associated control information of the service tunnel comprises at least one of: subscriber service authorization information related to the service tunnel and information for maintaining status of the service tunnel.

7. The method according to claim 1, wherein during process of releasing the resources of the service tunnel, the PDG removes all stored authorization information related to the UE therefrom when the PDG detects that the service tunnel to be released is the last service tunnel between itself and a corresponding UE.

8. The method according to claim 1, wherein the tunnel disconnection report is carried in an existing service terminating signaling and is sent to the service authentication and authorization unit.

9. The method according to claim 1, wherein said PDG sending a tunnel disconnection report to a service authentication and authorization unit comprises the step of the PDG releasing the resources of the service tunnel and sending the tunnel disconnection report to the service authentication and authorization unit.

10. The method according to claim 1, wherein the step of a PDG sending a tunnel disconnection report to a service authentication and authorization unit comprises:
the PDG sending the tunnel disconnection report to the service authentication and authorization unit when sending the release acknowledgement to the UE.

11. The method according to claim 1, wherein the related service information comprises at least one of service/tunnel connection activation information, allocated IP address, status of the service tunnel, tunnel ID and tunnel security information.

12. The method according to claim 1, wherein the service authentication and authorization unit is a 3GPP Authentication, Authorization and Accounting (AAA) Server.

13. The method according to claim 1, wherein the originating end point is a PDG and the corresponding end point is a UE.

14. The method according to claim 1, wherein said PDG sending a tunnel disconnection report to a service authentication and authorization unit comprises the step of
the PDG sending the tunnel disconnection report to the service authentication and authorization unit and releasing the resources of the service tunnel upon receiving an acknowledgement from the service authentication and authorization unit.

15. The method according to claim 1, wherein said PDG sending a tunnel disconnection report to a service authentication and authorization unit comprises the step of
the PDG releasing the resources of the service tunnel except those for sending information to the service authorization and authentication unit, and releasing the remained resources for sending information to the service authentication and authorization unit upon confirming that the tunnel disconnection report has been successfully sent to the service authentication and authorization unit.

16. A method for releasing a service tunnel in a WLAN, comprising:
a Packet Data Gateway (PDG) which desires to release a service tunnel in the WLAN, sending a release tunnel request to a user equipment (UE) corresponding to the service tunnel to be released;
the UE returning a release acknowledgement to the PDG and releasing resources of the service tunnel;
the Packet Data Gateway sending a tunnel disconnection report to a 3GPP AAA server; and
upon receiving the tunnel disconnection report, the 3GPP AAA server updating self-stored related service information and/or status of subscriber.

17. The method according to claim 16, wherein during process of releasing the resources of the service tunnel, the PDG removes all stored authorization information related to the UE there from when the PDG detects that the service tunnel to be released is the last service tunnel between itself and a corresponding UE.

18. The method according to claim 16, wherein the tunnel disconnection report is carried in an existing service terminating signaling and sent to the 3GPP AAA server.

19. The method according to claim 16, wherein said PDG sending a tunnel disconnection report to a 3GPP AAA server comprises the step of:
the PDG releasing the resources of the service tunnel and sending the tunnel disconnection report to the 3GPP AAA server.

20. The method according to claim 16, wherein the step of a PDG sending a tunnel disconnection report to a 3GPP AAA server comprises
the PDG sending the tunnel disconnection report to the 3GPP AAA server upon receiving the release acknowledgement from the UE.

21. The method according to claim 16, wherein the related service information comprises at least one of: service/tunnel connection activation information, allocated IP address, status of the service tunnel, tunnel ID and tunnel security information.

22. The method according to claim 16, wherein said PDG sending a tunnel disconnection report to a 3GPP AAA server comprises the step of
the PDG sending the tunnel disconnection report to the 3GPP AAA server and releasing the resources of the service tunnel upon receiving an acknowledgement from the 3GPP AAA server.

23. The method according to claim 16, wherein said PDG sending a tunnel disconnection report to a 3GPP AAA server comprises the step of
the PDG releasing the resources of the service tunnel except those for sending information to the 3GPP AAA server, and releasing the remained resources for sending information to the 3GPP AAA server upon confirming that the tunnel disconnection report has been successfully sent to the 3GPP AAA server.

* * * * *

UNITED STATES PATENT AND TRADEMARK OFFICE
CERTIFICATE OF CORRECTION

| | |
|---|---|
| PATENT NO. | : 7,633,918 B2 |
| APPLICATION NO. | : 11/481057 |
| DATED | : December 15, 2009 |
| INVENTOR(S) | : Wenlin Zhang |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 702 days.

Signed and Sealed this

Ninth Day of November, 2010

David J. Kappos
*Director of the United States Patent and Trademark Office*